US008355983B1

(12) United States Patent  (10) Patent No.: US 8,355,983 B1
Parr et al.  (45) Date of Patent: Jan. 15, 2013

(54) METHOD AND SYSTEM FOR VEHICLE FINANCE CREDIT ANALYSIS

(75) Inventors: Gina M. Parr, Sacramento, CA (US); Howard L. Parr, Sacramento, CA (US)

(73) Assignee: Lioness Financial Services, Inc., Sacramento, CA (US)

( * ) Notice: Subject to any disclaimer, the term of this patent is extended or adjusted under 35 U.S.C. 154(b) by 441 days.

(21) Appl. No.: 12/489,293

(22) Filed: Jun. 22, 2009

Related U.S. Application Data

(60) Provisional application No. 61/074,524, filed on Jun. 20, 2008.

(51) Int. Cl.
*G06Q 40/00* (2012.01)
(52) U.S. Cl. ................................ 705/38; 705/37; 705/35
(58) Field of Classification Search ............... 705/35–39
See application file for complete search history.

(56) References Cited

U.S. PATENT DOCUMENTS

| | | | | |
|---|---|---|---|---|
| 5,940,812 | A * | 8/1999 | Tengel et al. | 705/38 |
| 7,630,933 | B2 * | 12/2009 | Peterson et al. | 705/38 |
| 7,647,274 | B2 * | 1/2010 | Peterson et al. | 705/38 |
| 2002/0065707 | A1 * | 5/2002 | Lancaster et al. | 705/10 |
| 2005/0234814 | A1 * | 10/2005 | Jones et al. | 705/38 |
| 2008/0319895 | A1 * | 12/2008 | Lazerson | 705/38 |

OTHER PUBLICATIONS

Ko, C., Lin, T. T., PhD., Liu, C., & Chang, H. (2007). The two-stage optimal matching loan quality model. The Business Review, Cambridge, 8(2), 52-60. Retrieved from http://search.proquest.com/docview/197304479?accountid=14753.*
Oh, I., Lee, J., Heshmati, A., & Choi, G. (2009). Evaluation of credit guarantee policy using propensity score matching. Small Business Economics, 33(3), 335-351. doi: 10.1007/s11187-008-9102-5.*

\* cited by examiner

*Primary Examiner* — Sarah Monfeldt
*Assistant Examiner* — Abhishek Vyas
(74) *Attorney, Agent, or Firm* — Pillsbury Winthrop Shaw Pittman LLP

(57) ABSTRACT

Assimilating data and applying reasoning mechanisms for matching a vehicle buyer's credit history, vehicle details, and vehicle deal structure details, to the purchasing guidelines of the most suitable finance sources is described. The system aids the dealership agent in quickly locating the finance sources that best fit the specific criteria of the customer, the vehicle, and the proposed financial structure of the deal. The system also enables the finance sources to increase the quality of the fit of those applications reviewed for potential contract purchase, to see the specific details that are integral in making purchasing decisions in advance of reviewing the entire application, to actively manage the risk level of its auto finance portfolio, and to automate its purchasing decisions. The system allows the vehicle buyer, vehicle dealership, and finance source to match on a near instantaneous basis, thereby reducing the time involved in the vehicle sales process to a fraction of its current burden.

13 Claims, 22 Drawing Sheets

REGISTRATION PROCESS:

BankHunter Algorithm Question Parameters

Algorithm Score

1 -    Bank allows Experian?
         Applicant scores above specific bank minimum, and bank allows Experian        1
         Bank allows Experian, but applicant Experian score does not meet bank minimum credit score    0
         Bank does not allow Experian    -1

Bank allows TransUnion?
2 -    Applicant scores above specific bank minimum, and bank allows TransUnion    1
         Bank allows TransUnion, but applicant TU score does not meet bank minimum credit score    0
         Bank does not allow TransUnion    -1

Bank allows Equifax?
3 -    Applicant scores above specific bank minimum, and bank allows Equifax    1
         Bank allows Equifax, but applicant Equifax score does not meet bank minimum credit score    0
         Bank does not allow Equifax    -1

4 -    Using highest credit score from eligible bureaus (Those that scored 1 in Questions 1-3):

High credit score meets bank minimum credit score    1
         High credit score does not meet bank minimum credit score    0 (STOP)

*If Applicant high credit score does not meet minimum for *any* eligible banks on dealer bank list,
         user sees the following validation on Bank Recommendation Page:
         BankHunter cannot make recommendations based on the sorting of the information submitted 5 -    Applicant has bankruptcy and bank allows bankruptcy
         Yes to both conditions    1
         Applicant has bankruptcy, and bank disallows bankruptcy    0 (STOP)
         If Applicant does not have a bankruptcy    -1

6 -    Applicant is at ≥ bank minimum bankruptcy discharge (in months)
         Yes    1
         No    0 (STOP)
         Applicant does not have bankruptcy    -1

7 -    Applicant has foreclosure and bank allows foreclosure
         Yes to both conditions    1
         Applicant has foreclosure, and bank disallows foreclosure    0 (STOP)
         Applicant does not have foreclosure    -1

8 -    Bank requires that foreclosure is paid?
         If yes, and Applicant has paid foreclosure    1
         If yes, and Applicant has not paid foreclosure    0 (STOP)
         If bank does not require that foreclosure is paid OR Applicant does not have foreclosure    -1

9 -    Applicant has tax liens and bank allows tax liens
         Yes to both conditions    1
         Applicant has tax lien, and bank disallows tax liens    0 (STOP)
         Applicant has no tax liens    -1

FIG. 6a

BankHunter algorithm continued...            <u>Algorithm Score</u>

10 - Bank requires that tax liens are paid
- If yes, and Applicant has paid tax lien(s)    1
- If yes, and Applicant has unpaid tax lien(s)    0 (STOP)
- If bank does not require that tax liens are paid OR if Applicant has no tax liens    -1

11 - Applicant has repossession, and bank allows repossession
- Yes to both conditions    1
- Applicant has repossession, but bank disallows repossession    0 (STOP)
- Applicant does not have repossession    -1

12 - Bank requires that repossession is paid
- If yes, and Applicant has paid repossession    1
- If yes, and Applicant has unpaid repossession    0 (STOP)
- If bank does not require that repossession is paid OR if Applicant does not have repossession    -1

13 - Applicant has chargeoffs, and bank allows chargeoffs
- Yes to both conditions    1
- Applicant has chargeoffs, and bank disallows chargeoffs    0 (STOP)
- Applicant does not have chargeoffs    -1

14 - Bank requires that chargeoffs are paid
- If yes, and Applicant has paid chargeoffs    1
- If yes, and Applicant has unpaid chargeoffs    0 (STOP)
- If bank does not require that chargeoffs are paid OR if Applicant does not have chargeoffs    -1

15 - Applicant allows collections, and bank allows collections
- Yes to both conditions    1
- Applicant has collections, and bank disallows collections    0
- Applicant has no collections    -1

16 - Accounts
Applicant is currently past due & bank allows currently past due
- Yes to both conditions    1
- Applicant is currently past due & bank disallows currently past due    0
- Applicant is not currently past due    -1

17 - Installment loan(s)
Applicant is currently 30/60/90 days late & bank allows 30/60/90 days late
- Yes to both conditions    1
- Applicant is 30/60/90 days late, & bank disallows 30/60/90 days late    0
- Applicant is not 30/60/90 days late    -1

18 - Real Estate
Applicant is 30/60/90 days late & bank allows 30/60/90 days late
- Yes to both conditions    1
- Applicant is 30/60/90 days late & bank disallows 30/60/90 days late    0
- Applicant is not 30/60/90 days late    -1

19 - Total trade lines (accounts on bureau) ≥ Bank Minimum Trades Required
- If condition is met    1
- If condition is not met    0

FIG. 6b

BankHunter algorithm continued...          <u>Algorithm Score</u>

20 - Applicant has no historical delinquencies
       If condition is met     1
       If condition is not met     0

21 - Applicant High Credit Limit ≥ Bank Minimum High Credit Limit
       If condition is met     1
       If condition is not met     0

22 - Applicant Oldest Account Date ≥ Bank Minimum Months on Credit Bureau
       If condition is met     1
       If condition is not met     0

23 - Amount financed ≤ 60/66/72/84/96 (term length in months) Maximum Dollar Amount Allowed
       If condition is met for corresponding finance term requested     1
       If condition is not met for corresponding finance term requested     0

24 - Amount financed ≥ 60/66/72/84/96 (term length in months) Minimum Dollar Amount Allowed
       If condition is met for corresponding finance term requested     1
       If condition is not met for corresponding finance term requested     0

25 - Vehicle Loan-To-Value (Amount Financed/Invoice Amount) ≤ Maximum Bank Loan-to-Value allowed
       If condition is met     1
       If condition is not met     0

26 - Applicant Gross Income ≥ Bank Minimum Allowable Gross Income
       If condition is met     1
       If condition is not met     0

27 - Debt-to-Income ratio:
       Total Monthly Payments/Applicant's Monthly Income ≤ Bank's Maximum Allowable DTI ratio
       If condition is met     1
       If condition is not met     0

28 - Down Payment
       (Cash + Rebate + Positive Net Trade Value) ≥ Bank Minimum Down Payment Required
       If condition is met     1
       If condition is not met     0

29 - Down Payment
       (Cash + Rebate + Positive Net Trade Value) ≥ 20% of the Total Selling Price
       If condition is met     1
       If condition is not met     0

30 - Applicant has Rebate, and Bank Allows Rebates as Down Payment
       If both conditions are met     1
       If Applicant has rebate, and bank disallows rebates as down payment     0
       If Applicant does not have a rebate     -1

31 - PTI: Payment to Income (of Applicant and/or Co-Applicant)
       Estimated monthly payment/Combined Gross Income ≤ Bank PTI Maximum
       If condition is met     1
       If condition is not met     0

32 - Applicant Has Extended Warranty and Bank Allows Extended Warranty
       If both conditions are met     1
       If applicant has extended warranty & bank disallows extended warranty     0
       If applicant does not have extended warranty     -1

FIG. 6c

BankHunter algorithm continued...  Algorithm Score

33 - Applicant has Co-Applicant AND Bank Allows Co-Applicant
    If both conditions are met      1
    If Applicant has Co-Applicant and bank disallows co-applicant      0
    If Applicant does not have Co-Applicant      -1

34 - Using <u>highest</u> credit score from eligible bureaus (Those that scored 1 in Questions 1-3):
    Co-Applicant High Credit Score ≥ Bank Minimum Credit Score
    If condition is met      1
        *Co-Applicant income is added to Applicant income, and Questions 26, 27 and 31 are
        re-posed (and re-scored) with the Applicant/Co-Applicant incomes <u>combined</u>
    If condition is not met      0
        *(Co-App Information not Considered + income is NOT combined for Questions 26, 27 and 31)
    If Applicant does not have Co-Applicant      -1

35 - Applicant is Self-Employed, and Bank Allows Self-Employed
    If both conditions are met      1
    If Applicant is self-employed, and bank disallows self-employed      0
    If Applicant is not self-employed      -1

36 - Self-Employed Customer High Credit Score ≥ Bank Minimum Score
    If condition is met      1
    If condition is not met      0 (STOP)

37 - Applicant Residence History ≥ Bank Minimum Residence History
    If condition is met      1
    If condition is not met      0

38 - Applicant Employment History ≥ Bank Minimum Employment History
    If condition is met      1
    If condition is not met      0

39 - Applicant has multiple open auto loans, and Bank allows multiple open auto loans
    If both conditions are met      1
    If Applicant has multiple open auto loans, and bank disallows multiple open auto loans      0
    If Applicant does not have multiple open auto loans      -1

40 - Vehicle is Daewoo, and Bank Allows Daewoo
    If both conditions are met      1
    If vehicle is Daewoo and bank disallows Daewoo      0
    If vehicle is not a Daewoo      -1

41 - Vehicle is 2003 or newer Kia, and Bank will allows 2003 or newer Kia
    If both conditions are met      1
    If vehicle is 2003 or newer Kia and bank disallows 2003 or newer Kia      0
    If vehicle is not a 2003 or newer Kia      -1

42 - Vehicle is Chevrolet Aveo, and Bank allows Chevrolet Aveo
    If both conditions are met      1
    If vehicle is is Chevrolet Aveo and bank disallows is Chevrolet Aveo      0
    If vehicle is not a is Chevrolet Aveo      -1

43 - Vehicle is 2003 or newer Suzuki, and Bank allows 2003 or newer Suzuki
    If both conditions are met      1
    If vehicle is 2003 or newer Suzuki and bank disallows 2003 or newer Suzuki      0
    If vehicle is not a 2003 or newer Suzuki      -1

44 - Vehicle is 1998 or newer Hyundai, and Bank allows 1998 or newer Hyundai
    If both conditions are met      1
    If vehicle is 1998 or newer Hyundai and bank disallows 1998 or newer Hyundai      0
    If vehicle is not a 1998 or newer Hyundai      -1

FIG. 6d

BankHunter algorithm continued...      Algorithm Score

- 45 - Vehicle is a One Ton, and Bank allows One Tons
  - If both conditions are met — 1
  - If vehicle is One Ton and bank disallows One Tons — 0
  - If vehicle is not a One Ton — -1

- 46 - Vehicle Age is $\leq$ Bank Maximum Vehicle Age in months (Today's Date – Vehicle Year x 12)
  - If condition is met — 1
  - If condition is not met — 0

- 47 - Vehicle Mileage < Bank Maximum Vehicle Mileage
  - If condition is met — 1
  - If condition is not met — 0

- 48 - Bank has Minimum Vehicle Wholesale/Invoice Value & Customer Vehicle Value $\geq$ Bank Minimum
  - If condition is met — 1
  - If condition is not met — 0

Scoring Totals & Recommendations

Algorithm examines credit history from ALL three bureaus for the following questions:
5-24, 36, 39

Total Number of Questions answered with a score of 1 divided by Total Number of Questions Applicable
(those scoring 1 or 0) = Percentage Score for each bank Banks are ranked highest to lowest in order of scoring percentage matches
Banks are given a Y (yes) or N (no) designation to indicate whether or not they have been placed on Dealer's Bank List.
The top 3 banks with a Y designation next to them are on the Bank Recommendations Page for that credit application*

*If all of the recommended banks matched at below 50%, the user sees the following validation below the recommendations:
The information as submitted is below BankHunter's minimum quality threshold for all three recommendations.

FIG. 6e (↓ indicates a pull down menu)

Enter Finance Source Information

Finance Source: ABC Bank ↓    Update/ Delete / Add New
Bank Information has been Saved Finance Source Name: ABC Bank

Customer Requirements

| Min. time @ Residence – Mnths: | 60 | Mininum Credit Score | 700 |
|---|---|---|---|
| Allow Self-Employed: | No↓ | Self-Employed Minimum Credit Score: | 760 |
| Allows Co-applicant: | No↓ | Minimum Co-app Score: | 0 |
| Max PTI | 10 | Max DTI | 10 |
| Proof of Income Required | Yes↓ | Allow 1099 Proof of Income: | No↓ |
| Minimum Income: | 10000 | Min. Employment in Months: | 60 |
| Allow Business Applications: | No↓ | Allow Family Trust Purchases | No↓ |
| Allow Dealer Employees: | No↓ | | |

Credit History Guidelines

| Experien: | Yes↓ | Equifax: | Yes↓ |
|---|---|---|---|
| TransUnion: | Yes↓ | Customer Must Have Prior Credit: | Yes↓ |
| Minimum Months on Bureau: | 60 | Minimum high Credit: | 0 |
| Allows Prior Repo: | No↓ | Repo Must be paid: | Yes↓ |
| Bank Allows Prior Foreclosure: | No↓ | Prior Foreclosure Must be Paid | Yes↓ |
| Bank Allows Bankruptcies(BK): | No↓ | BK Min Time Dischrged in Months: | 0 |
| Bank Allow ChargeOffs: | No↓ | ChargeOff Must be Paid | Yes↓ |
| Bank Allows Tax Liens | No↓ | Tax Lien Must be Paid | Yes↓ |
| Bank Allows Collection: | No↓ | Collection Must be Paid: | Yes↓ |
| AllowCurrentPassDue: | No↓ | | |

Vehicle Requirements No↓

| Max Vehicle Age in Month: | 24 | Max Vehicle Mileage: | 10000 |
|---|---|---|---|
| Minimum Vehicle Ws/Inv. | 15000 | Ineligible Vehicles (Yes if ineligible): | Yes↓ |
| Daewoo: | Yes↓ | Kia > = 2003: | Yes↓ |
| Chevy Aveo: | Yes↓ | Suzuki > = 2003: | Yes↓ |
| RV: | Yes↓ | Commercial: | Yes↓ |
| Hyundai > = 1998: | Yes↓ | | |
| One-Ton: | Yes↓ | Salvage Title Vehicles: | Yes↓ |

FIG. 7a

Finance Source Guidelines

| Max Advance (LTV)%: | 80 | Max Front End Adv %: | 80 |
|---|---|---|---|
| Plus Backend Allowed in $$ | 500 | | |
| Minimum Down Payment $$ | 2000 | Max Term (months) | 60 |
| Min Amt Financed for 60 Mos. | 15000 | Max Amt Financed for 60 Mos. | 25000 |
| Min. Amt Financed for 66 Mos. | 0 | Max Amt Financed for 66 Mos. | 0 |
| Min. Amt Financed for 72 Mos. | 0 | Max Amt Financed for 72 Mos. | 0 |
| Min. Amt Financed for 84 Mos. | 0 | Max Amt Financed for 84 Mos. | 0 |
| Min. Amt Financed for 96 Mos. | 0 | Max Amt Financed for 96 Mos. | 0 |
| Max Warranty Advance ($$) | 0 | Max Warranty Adv (% of selling price) | 0 |
| Bank Allows Multiple Vehicle Loans | No↓ | Bank Allows Manufacturer Rebates as Down Payment: | Yes↓ |
| Bank Fee: | No↓ | Bank Fee Amount ($$): | 0 |
| Bank Allows for Rehash | No↓ | Bank Allows FTB Program: | No↓ |
| Bank Only Allows Simple Interest Contracts: | Yes↓ | | |

FIG. 7b

Bankhunter algorithm bank scoring

| | Dealer Name: | Hawg Kia | | |
|---|---|---|---|---|
| | Applicant Name: | Barbara, Credco | | |
| | Bank Name | Question Answered | App Score % | Dealer Bank |
| + | ABC Bank | 30 | 36.67 | N |
| + | DFG Bank | 29 | 31.03 | N |
| + | XYZ Bank | 29 | 31.03 | N |

Submit                                          Avg-Score 32.67 %

Log Out

Hello: Suzie Smith
Welcome to BankHunter®

BankHunter™ RPM

Monthly Fit Total: 74%

MM/DD/YYYY  To  MM/DD/YYYY  +  [SEARCH]  = ___% Fit Total

| RPM | | | DEAL HISTORY | | | BANK PROFILE | | | | | | |
|---|---|---|---|---|---|---|---|---|---|---|---|---|

Sort by ☐ Score: Highest to Lowest
☐ Time: Most Recent at Top of Each Section      Lowest Fit Level: [ 35 ] %

| $Income (M/Y) | Employment (Yr/Mo) | Address (Yr/Mo) | Year | Make | Model | Mileage | $Down | % | Term | Pmt. | FIT% | Review | Pass |
|---|---|---|---|---|---|---|---|---|---|---|---|---|---|
| 4200 M | 2/4 | 3/11 | 04 | BMW | 530i | 16543 | 3000 | 8.9 | 60 | 388 | 84 | ● ☐ | ☐ |
| 6500 M | 13/4 | 2/3 | 07 | Audi | A6 | 0 | 4000 | 5.9 | 36 | 810 | 82 | ☐ | ☐ |
| 38000 Y | 8/9 | 2/3 | 08 | Saturn | Vue | 0 | 1000 | 6.9 | 72 | 344 | 88 | ☐ | ☐ |
| 38000 Y | 8/9 | 2/3 | 08 | Saturn | Vue | 0 | 1000 | 6.9 | 72 | 344 | 72 | ☐ | ☐ |
| 38000 Y | 8/9 | 2/3 | 08 | Saturn | Vue | 0 | 1000 | 6.9 | 72 | 344 | 68 | ☐ | ☐ |
| 38000 Y | 8/9 | 2/3 | 08 | Saturn | Vue | 0 | 1000 | 6.9 | 72 | 344 | 62 | ☐ | ☐ |
| 38000 Y | 8/9 | 2/3 | 08 | Saturn | Vue | 0 | 1000 | 6.9 | 72 | 344 | 52 | ☐ | ☐ |
| 38000 Y | 8/9 | 2/3 | 08 | Saturn | Vue | 0 | 1000 | 6.9 | 72 | 344 | 48 | ☐ | ☐ |
| 38000 Y | 8/9 | 2/3 | 08 | Saturn | Vue | 0 | 1000 | 6.9 | 72 | 344 | 38 | ☐ | ☐ |
| 38000 Y | 8/9 | 2/3 | 08 | Saturn | Vue | 0 | 1000 | 6.9 | 72 | 344 | 36 | ☐ | ☐ |

Contact Us   Terms & Conditions   Security & Privacy

BankHunter™ is a service of  Lioness Financial Services, Inc.

FIG. 11

BankHunter Validations for Rapid Portfolio Management

BankHunter Deal History
Dealer completes buyer credit application, clicks "Hunt" button
BankHunter pulls credit from TransUnion, Experian, Equifax
BankHunter algorithm sorts buyer credit history information, car detail, deal structure information, and measures them against the guidelines of each specific finance source
BankHunter recommends the top 3 best matching finance sources, based upon algorithm matching results
Deals load onto Deal History page immediately once submitted by Dealer to BankHunter
User can see history for various dealerships according to privileges BankHunter RPM
Finance source names populate as banks make decisions regarding each application
Dealers can hover over bank name on Deal History page to see Financing Information (terms) window
Deals load immediately onto RPM page according to dealer active bank lists.
Finance sources see application data only from dealers with which they have active agreements.
Finance sources see application data in real-time as it is submitted to BankHunter
Finance sources choose to review (opens to their Application Status page) or pass
Finance sources can set low threshold filter for algorithm matching score on their RPM deal page
Finance sources have time limit to review or pass, and an additional time limit to provide finance terms.
Red dot flashes in final 30 seconds before deal disappears from table*
Finance sources enter terms/comments/stipulations
Dealer can then see bank entry (on Deal History page), and can then negotiate/finalize contract directly with finance source

*Unless no bank has checked Review, in which case the deal stays on table for several minutes longer

METHOD AND SYSTEM FOR VEHICLE FINANCE CREDIT ANALYSIS

RELATED APPLICATIONS

This application is related to and claims priority from U.S. Provisional Application No. 61/074,524 entitled "Method and System for Vehicle Finance Credit Analysis" filed on Jun. 20, 2008, which application is expressly incorporated by reference herein.

BACKGROUND

Conventional vehicle financing may require significant manual processing to determine a suitable match between a buyer and finance source. FIG. 5 illustrates a conventional process which lacks algorithms for automating the evaluation of credit applications. As a result, every application for credit must be manually reviewed to identify possible matches between buyers and finance sources. Furthermore, it may be necessary for the vehicle dealer to manually enter all of the bank and buyer's information. Accordingly, conventional financing processes may be labor intensive and error prone.

SUMMARY

According to various embodiments, vehicle buyers are matched with finance sources using transaction data, e.g., vehicle buyer's credit history, vehicle attributes, vehicle deal structure attributes, and the purchasing guidelines of finance sources. In an embodiment, referred to herein as a "Bankhunter," loan offices at vehicle dealerships can quickly locate finance sources that best fit the specific criteria of the customer, vehicle, and proposed financial structure of the deal. The vehicle buyer, vehicle dealership, and finance source can be matched nearly instantaneously, thereby reducing the time involved in the vehicle sales process. Finance sources can therefore reduce expenditures currently spent reviewing credit applications that do not fit their purchasing guidelines, which are reportedly 70-80%. In addition, finance sources can increase the quality of applications reviewed for potential contract purchase.

In an embodiment, a rapid portfolio management system allows finance sources to view the principle metrics used to make purchasing decisions before reviewing the entire application. Additionally, the finance sources can actively manage the risk level of their vehicle finance portfolio and can adjust the required level of application quality so that that the finance source can automate all, or substantially all, of its purchasing decisions.

According to various embodiments, the method and system can include 1) a database management subsystem configured to collect and manage data associated with the finance transaction via end-user data entry and electronic access of remote databases, e.g., credit reporting services; 2) a sorting algorithm configured to apply a knowledgebase and inference engine (e.g., an assessment model) utilizing a scoring system and generalized weighting approach to analyze credit application input and credit history against the specified criteria of each individual finance source; and 3) a scoring system configured to apply to every finance source in the database a recommendations page that lists the top matching finance sources, typically the 3 best, sorted from those finance sources previously selected by the individual vehicle dealership; an archived history of activity by individual dealer and/or auto group; and a table of real-time auto finance credit applications that allows a finance source to elect to bid on those applications which fit its institutional risk management levels. According to further embodiments, vehicle dealerships and auto groups can self-register, self-manage bank & dealership user lists, and receive results automatically.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 6 illustrates sorting algorithm question parameters according to an embodiment.

FIG. 7 illustrates finance source information in an embodiment.

FIG. 8 illustrates the cumulative results for all banks scored on a specific credit application.

FIG. 10 illustrates a deal history page for dealers when the BankHunter software begins using Rapid Portfolio Management according to an embodiment.

FIG. 11 illustrates a Rapid Portfolio Management table which may be seen only by those finance sources with access to this BankHunter service according to an embodiment.

FIGS. 12a and 12b each show a flowchart of overall steps according to an embodiment of the system.

DETAILED DESCRIPTION

Figure 1:
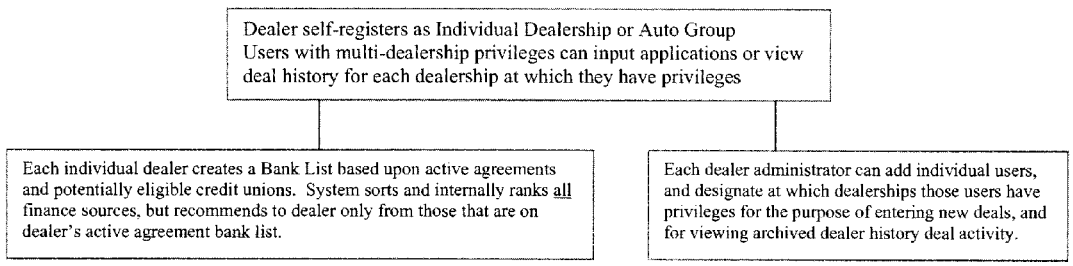
FIG. 1 illustrates an overview of the vehicle dealer registration process according to an embodiment.

FIG. 1 illustrates the vehicle dealer registration process according to an embodiment. A dealer administrator can add dealers and designate at which dealerships those users have privileges for the purpose of entering into new deals and for viewing historical deal activity. Dealers can then self-register as an Individual Dealership or Auto Group, and may input applications or view deal history for each dealership at which they have privileges. Each dealer can create a list of banks providing financing for vehicle buyers. In an embodiment, the banks providing financing can be sorted and ranked. A list of recommended banks can be outputted to the dealer comprising only institutions on the dealer's bank list.

Figure 2:
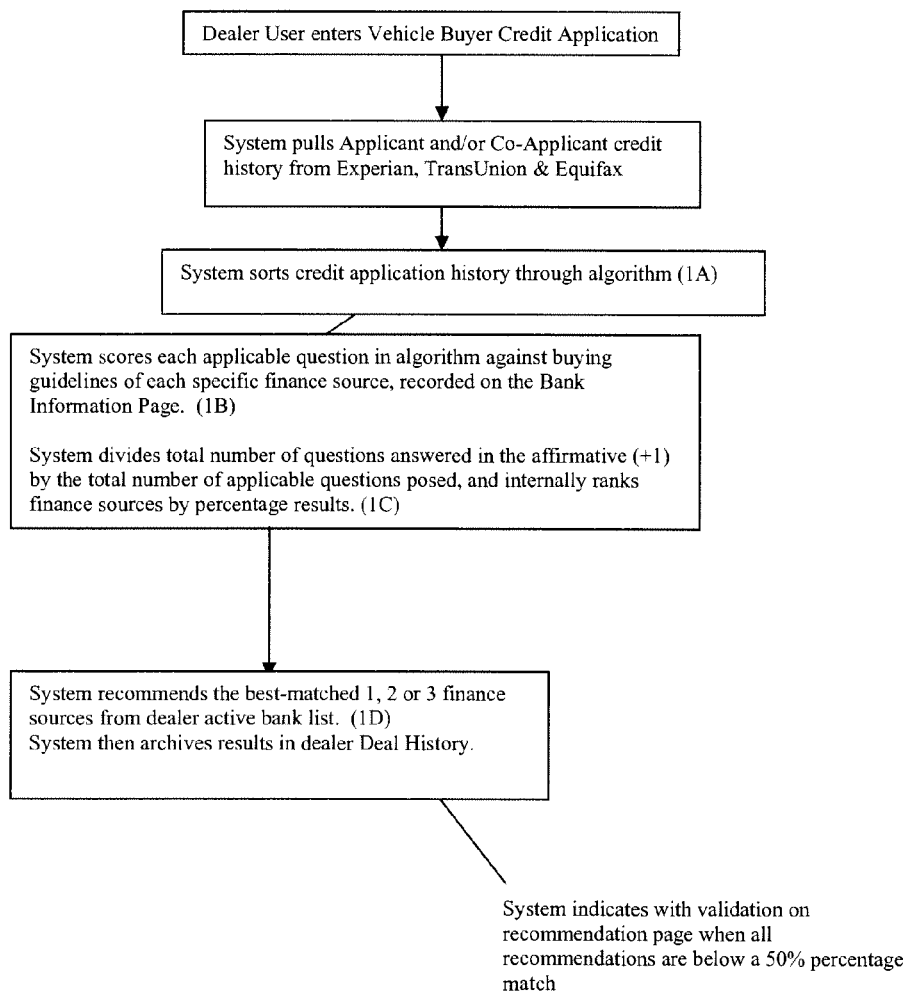
FIG. 2 illustrates an overview of the process described herein.

FIG. 2 illustrates an overview of the process for generating a list of recommended finance sources. The dealer completes a credit application for a vehicle buyer. Additional data, such as the credit history of the vehicle buyer, can be captured from external databases. Using an algorithm, the credit history of the vehicle buyer can be compared against the requirements of each finance source. A score can be generated for each finance source indicating the proportion of the requirements met by the vehicle buyer for that finance source. The finance sources can be ranked based on the score to produce a list of finance sources which are the best suited to the vehicle buyer.

Figure 3:
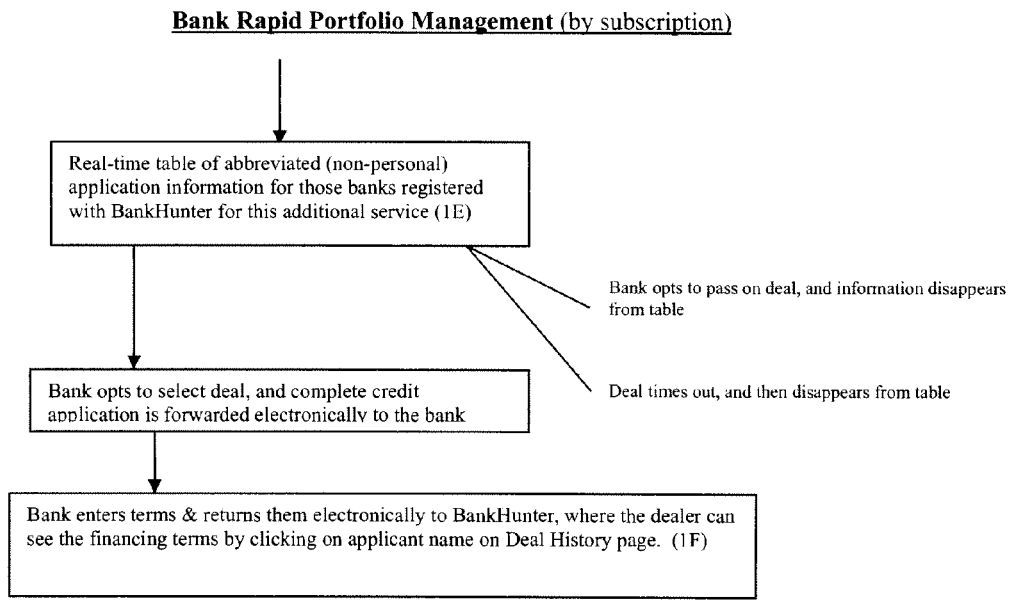
FIG. 3 illustrates bank rapid portfolio management according to an embodiment.
Figure 4A:
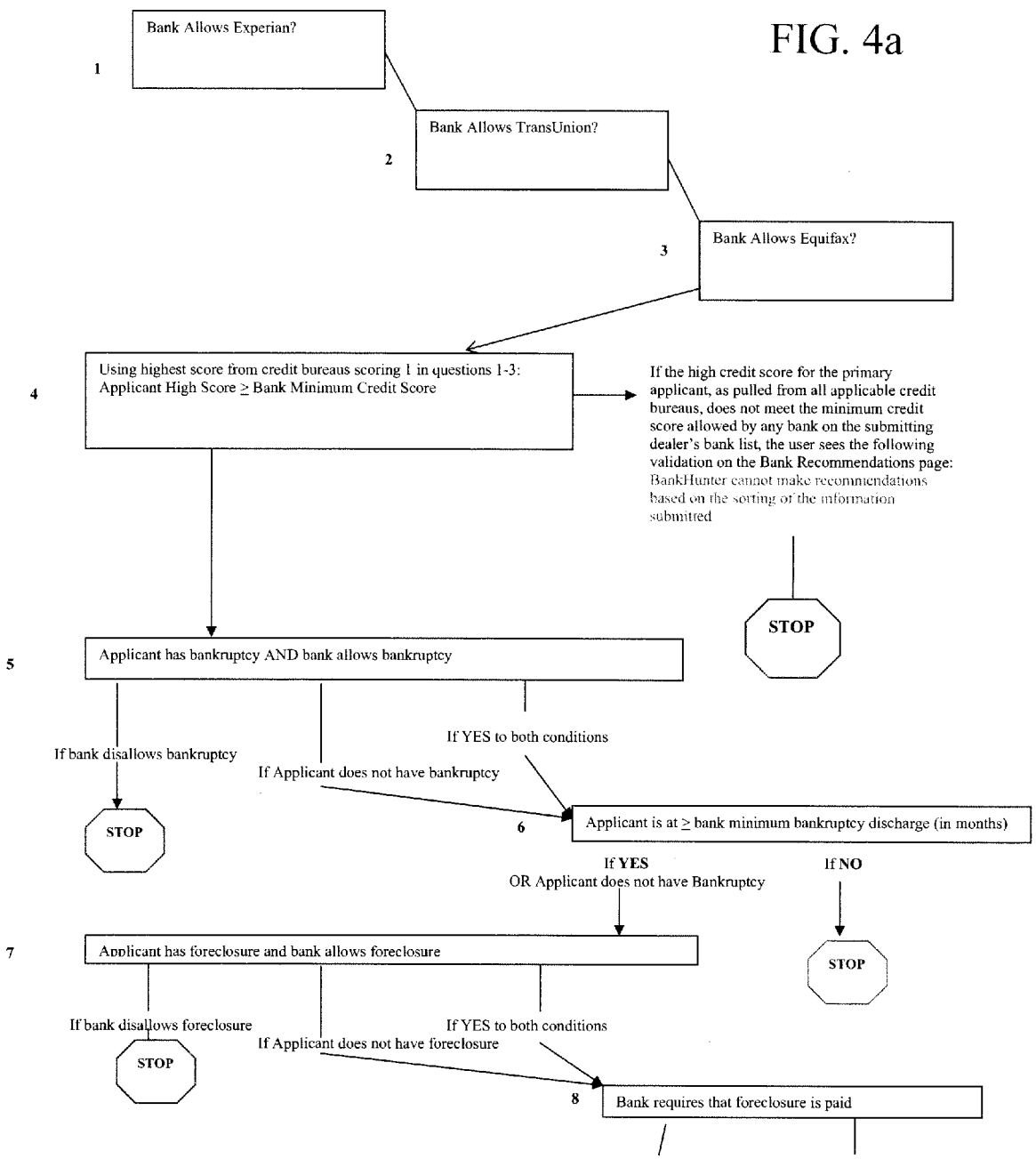
FIG. 4 illustrates a sorting algorithm according to an embodiment.
Figure 4B:
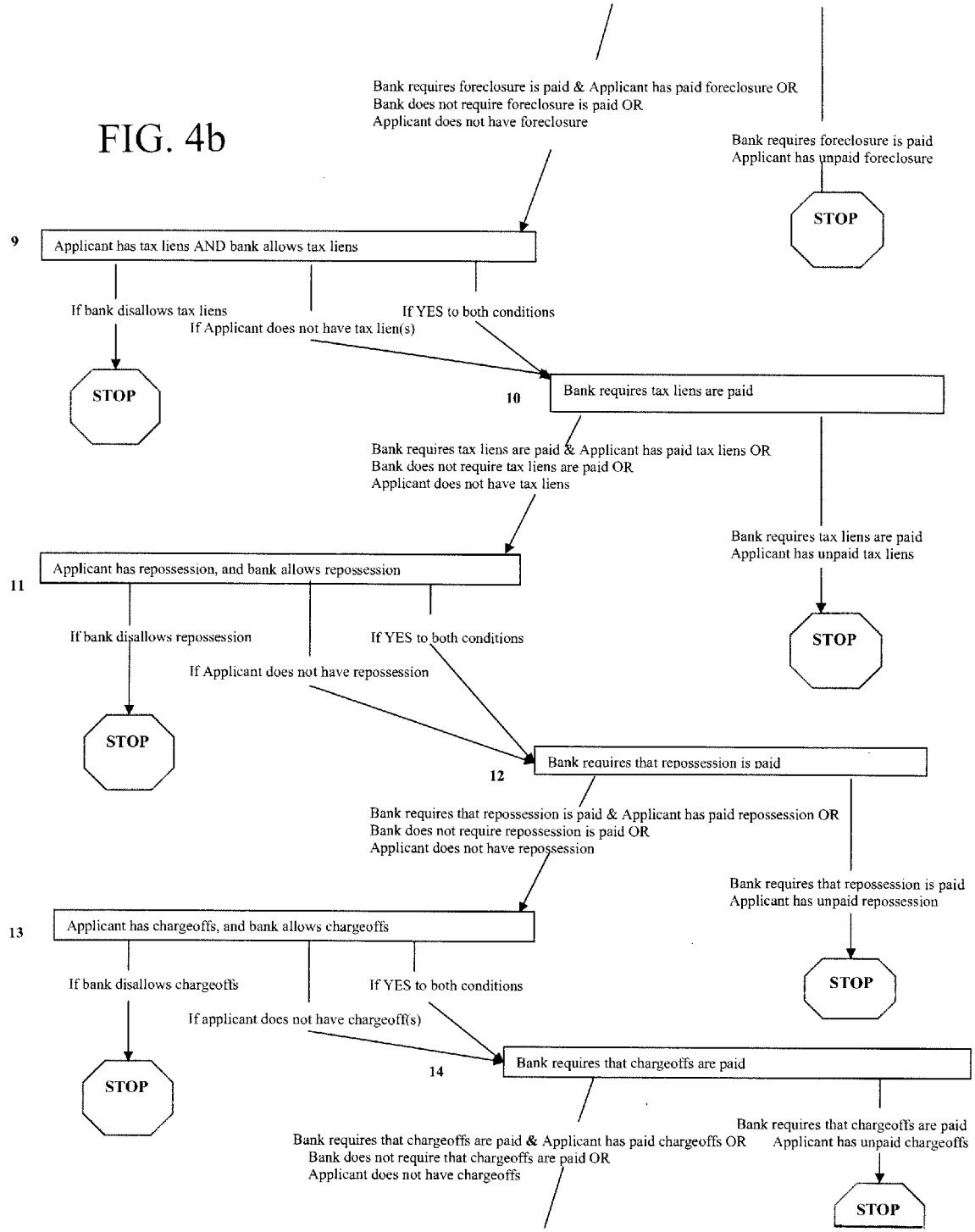
Figure 4C:
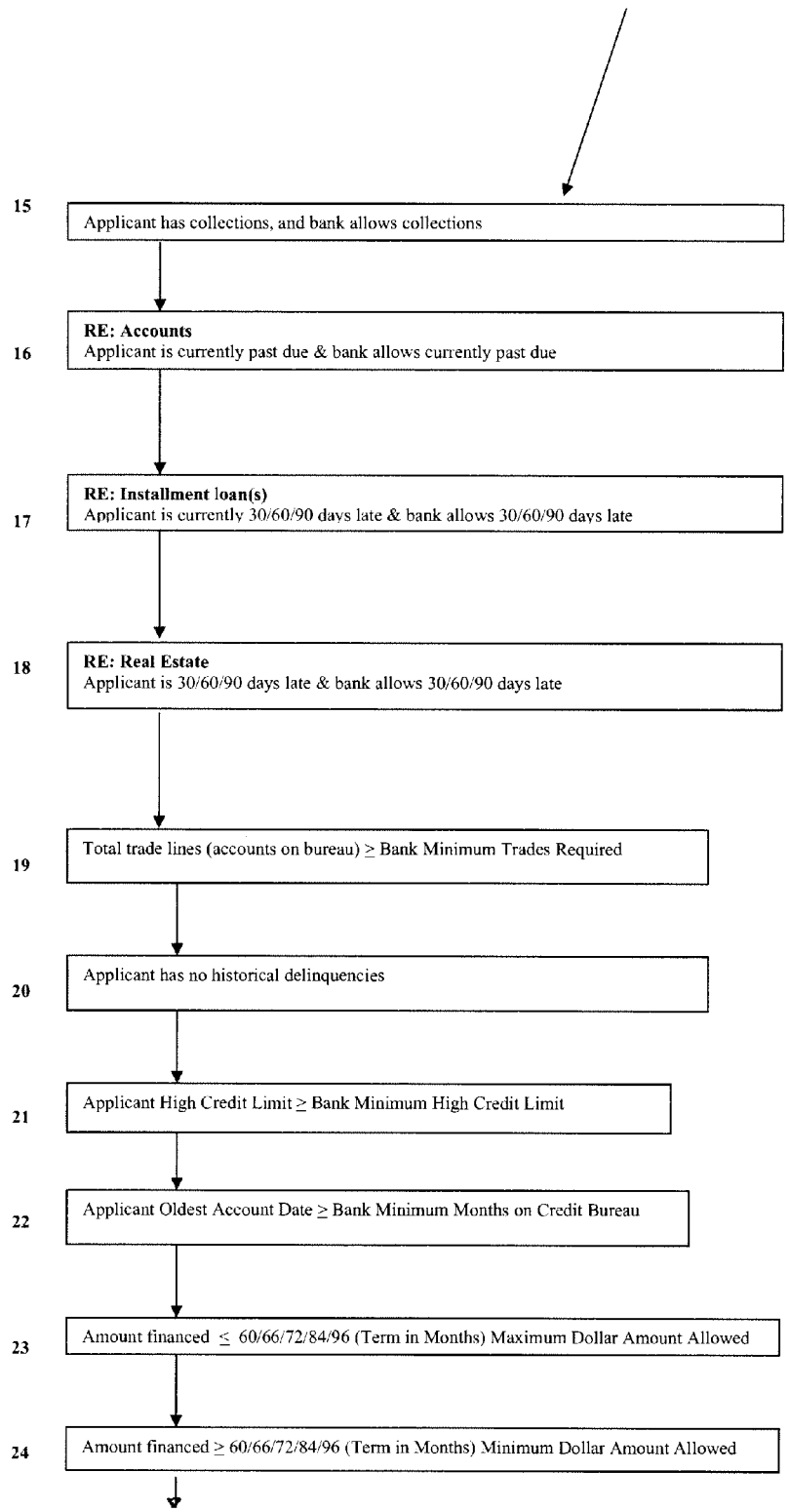
Figure 4D:
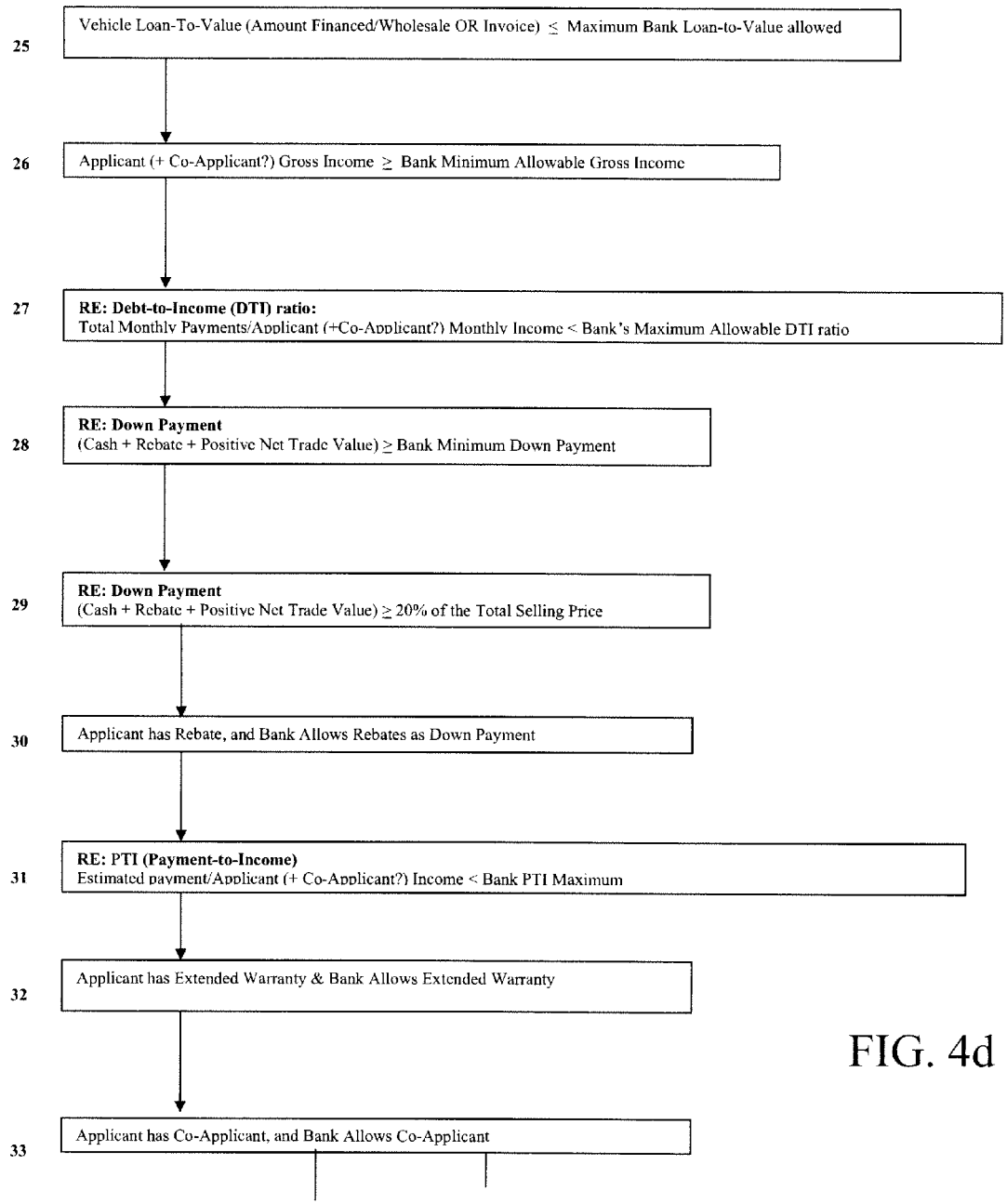
Figure 4E:
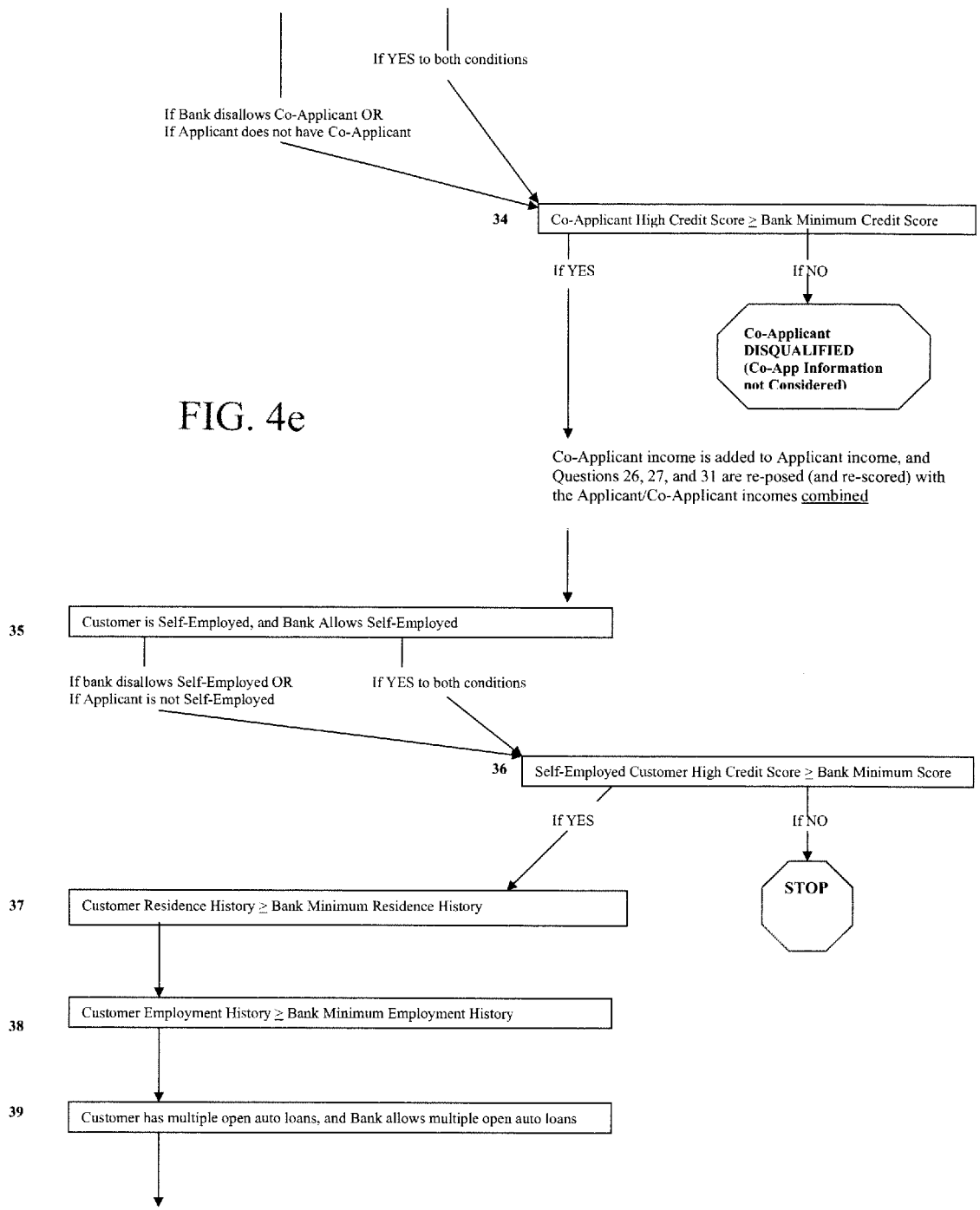
Figure 4F:
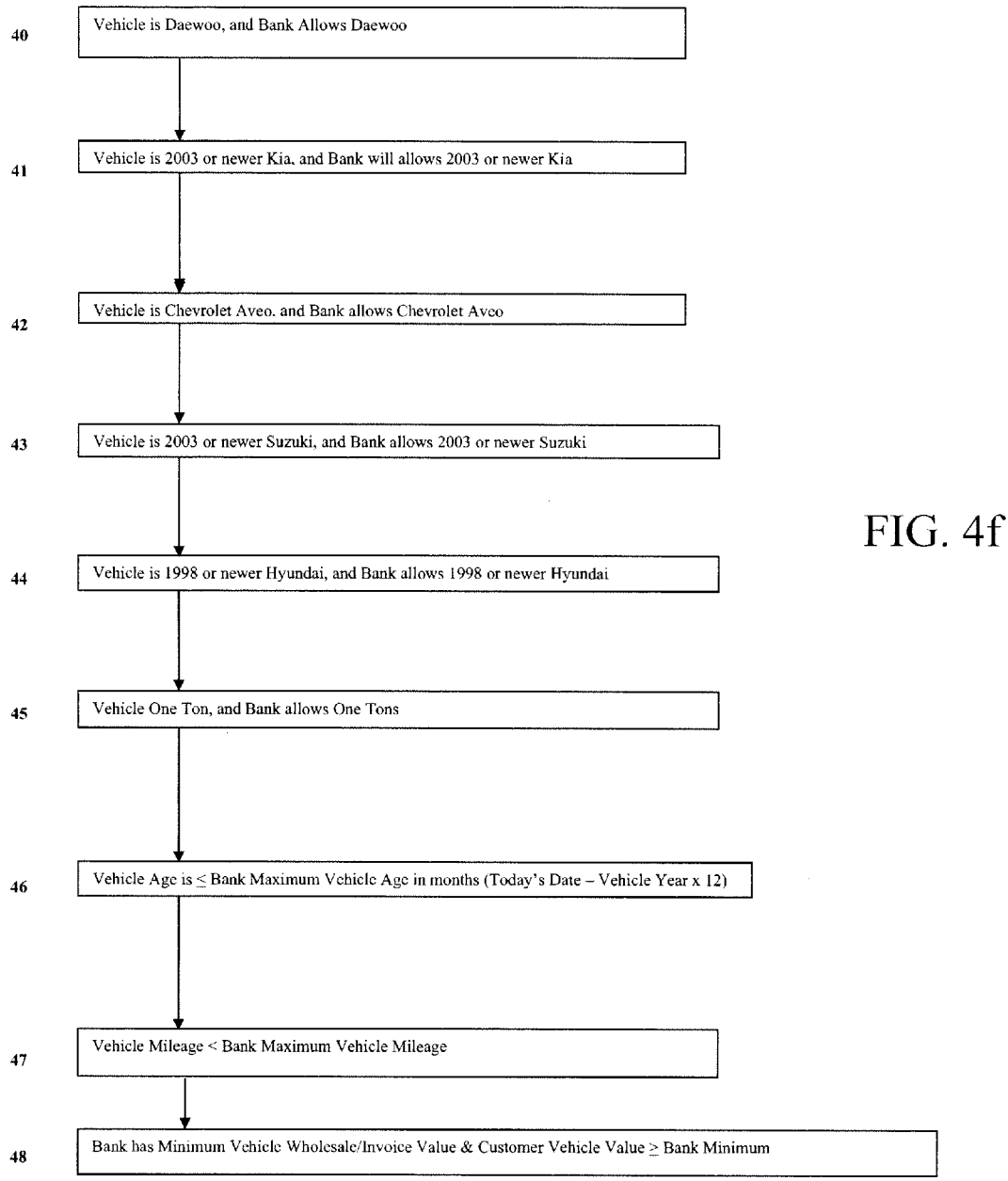
Figure 5:
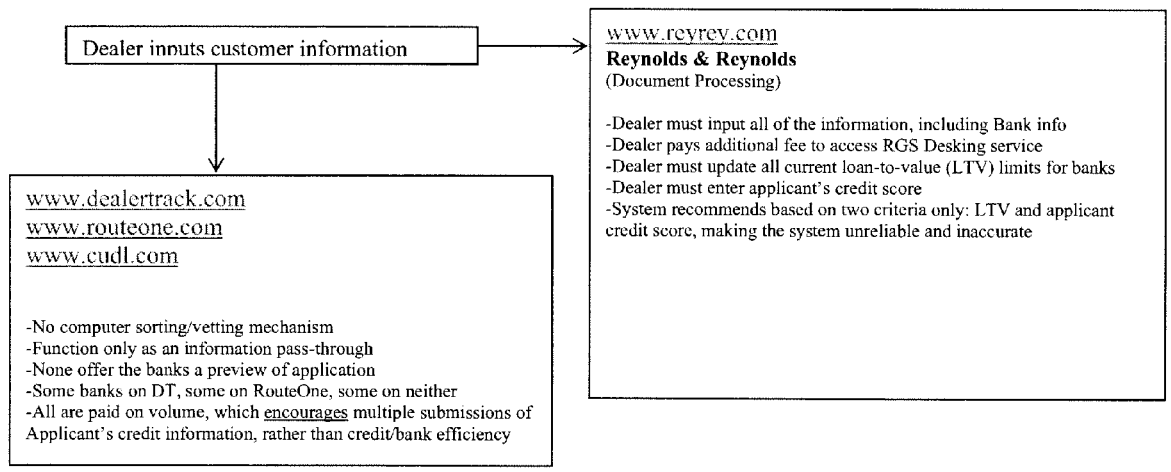
FIG. 5 illustrates a conventional vehicle finance source.

In an embodiment, the credit applications can be submitted and viewed by the finance sources (FIG. 3). The finance sources can view an abbreviated list of credit applications configure to display non-personal credit application information (e.g., which does not identify the gender, race, etc.) of the vehicle buyer. The finance source can reject a credit application or allow the credit application to expire, in which case, the credit application is removed from the list of applications. Alternatively, the finance source can select a credit application, which is then forwarded in its entirety to the finance source. The finance source may accept the credit application and return to BankHunter the financing terms for the vehicle buyer.

FIG. 4 illustrates a sorting algorithm according to an embodiment. In steps 1-4, it is determined whether the credit score of the vehicle buyer is higher than a minimum threshold required by the bank. If not, the algorithm terminates without providing the buyer with a list of finance sources. If the credit score of the buyer exceeds the required threshold, various financial metrics of the buyer are evaluated in steps 5-32. For instance, according to various embodiments, the algorithm may consider whether the buyer has had bankruptcies, foreclosures, tax liens, repossession, charge offs, collections, past due accounts, etc. which exclude them from qualifying for financing from a particular finance source. Additional metrics may include the buyer's number of trade lines, historical delinquencies, credit limit, oldest account date, income, debt-to-income ratio, down payment, etc. Steps 33 and 34 evaluate a buyer's co-applicant, if any. Steps 45-39 evaluate the buyer's personal information such as their duration of residence and employment. Steps 40-48 evaluate attributes specific the vehicle being purchased. Based on the results of the algorithm, it is determined whether the buyer fails to qualify for a loan from a particular finance source and/or the rank of the finance source based on the fit of the buyer and finance source as indicated by the question results.

FIG. 6 illustrates question parameters for a sorting algorithm according to an embodiment which may be used with the process described with respect to FIG. 4. For each question, a score is determined based on whether the buyer meets particular requirements. By dividing the total sum of the scores for the individual questions by the total score possible, a percentage score for each finance source can be determined. The finance sources can be ranked in order of their percentage score. The top finance sources (e.g., three) which are on the dealer's bank list may be provided as the recommended finance sources. In the event that the percentage score is below a threshold (e.g., 50%), a message may be generated indicating that the credit application is below BankHunter's minimum quality threshold.

FIG. 7 illustrates the lending guidelines specific to each finance source, and each corresponds to a question posed by the sorting algorithm. Where each credit bureau, vehicle type/year range, or vehicle brand is mentioned, the entry is YES or NO with respect to whether or not this specific bank allows each respective credit bureau, vehicle type/year range, or brand.

Max Advance (LTV) is the maximum loan amount, in the form of a percentage, relative to the book value of the vehicle DTI is debt to income, represented by the amount of monthly debt already assumed by the vehicle buyer, as a percentage of their gross income All other entries are self-explanatory FIG. 8 illustrates the cumulative result for all banks scored on a specific credit application. In particular, the algorithm calculates a percentage (or fit) score that is devised by dividing the total number of applicable questions (score 1 or 0 on the algorithm) by the total number of questions answered in the affirmative (score 1). The banks are then ranked in order of highest to lowest score. The column to the right (Dealer Bank) illustrates whether or not the dealer submitting the credit application has placed that bank on their active bank list. If yes, a Y will appear. The dealer will receive recommendations only from their active bank list. If a bank is not on the dealer's active bank list, the algorithm will sort the information, but an N will appear in the right column, and a recommendation for that bank will not be made visible to the dealer.

An average score results as well, and it is visible only to Lioness Administrative users. If the top 3 recommendations are all under a 50% fit, the dealer will see the recommendations, along with a validation on the Bank Recommendation page:

The information as submitted (in the example provided on the FIG. 8) is below BankHunter's minimum quality threshold for all three recommendations. It is also noted that when fully automated there is no need for a SUBMIT button, as it is a manual function, and when automated as in the preferred embodiment only those results that meet the criteria recommendations are automatically shown.

Figure 9:
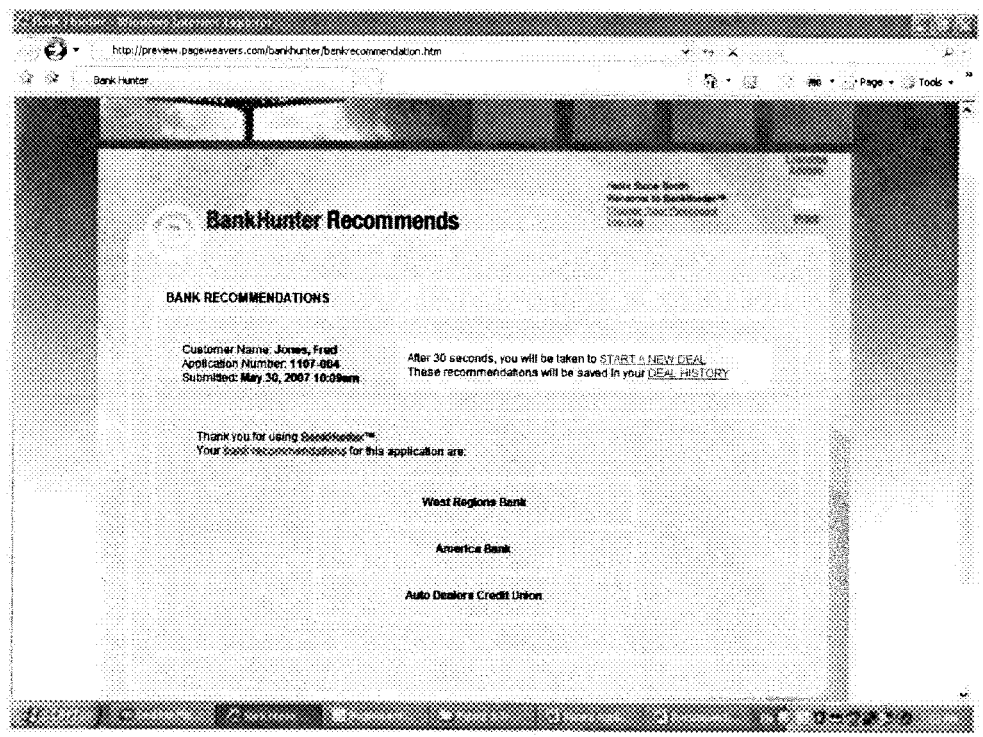
FIG. 9 illustrates an output of the recommendation according to an embodiment.

FIG. 9 illustrates an output of the recommendation according to the system of an embodiment.

Figure 10:
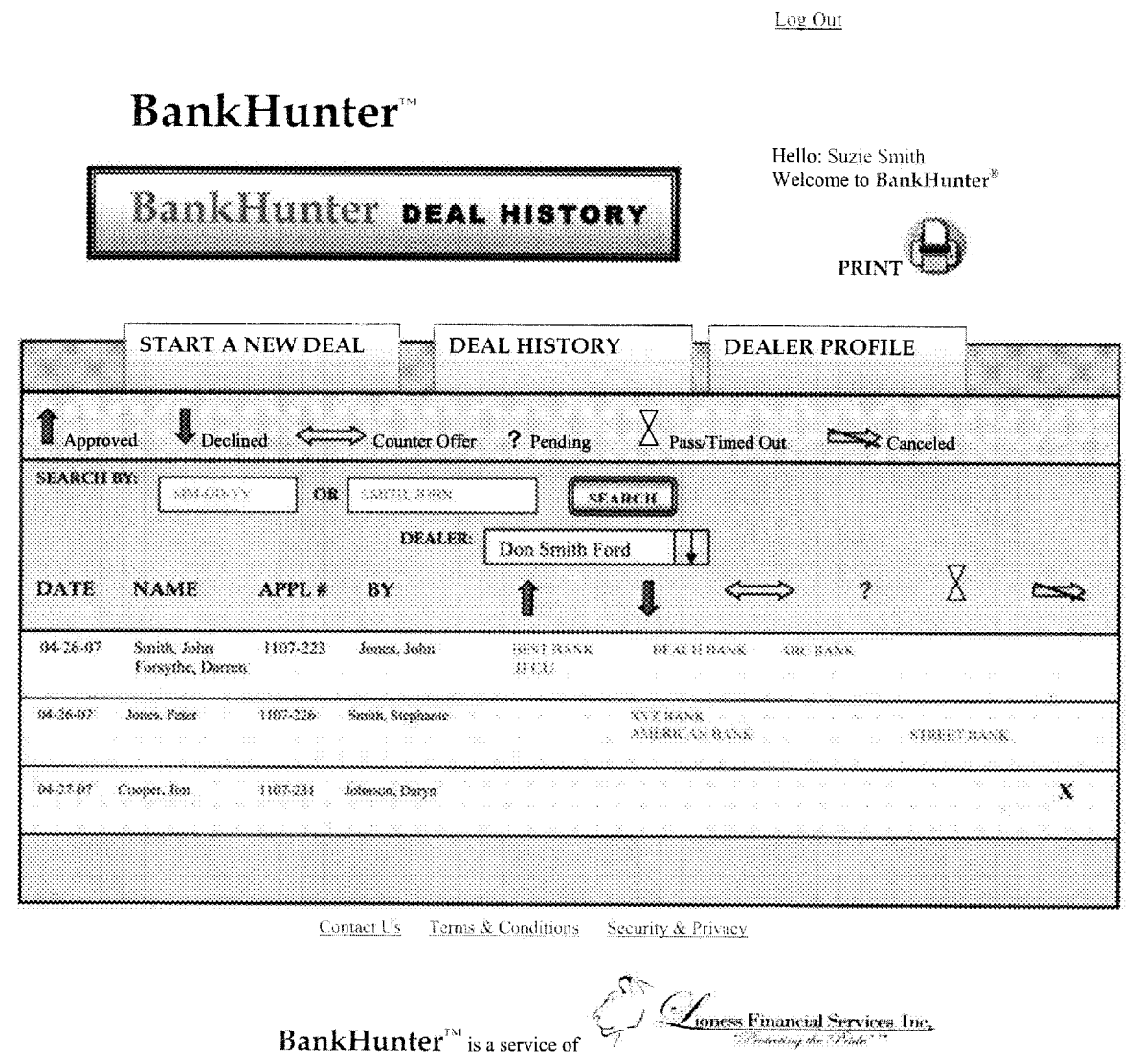

FIG. 10 illustrates the Deal History page for dealers when the BankHunter software begins using Rapid Portfolio Management. The current Deal History page demonstrates only the applicant information and the recommended banks. This page demonstrates with a system of symbols the current status for all submitted applications, and the respective responses for each specific bank that has had the opportunity to review either the application in full, or an advanced table of the details, described hereinafter in FIG. 11.

FIG. 11 illustrates the Rapid Portfolio Management table which is seen only by those finance sources with access to this BankHunter service. The credit reviewer is able to view in real-time ample detail for each credit application submitted, as well as the BankHunter algorithm fit score for each credit application submitted, so as to be able to opt to see the entire application for credit review, or to pass on the application altogether. This figure provided is an average fit score for the month, which allows the finance source to actively manage its risk level by targeting a specific fit score each month. The figure also allows the finance source to see its fit score for applications over a specific date range. The red dot is used as an indication to the viewer that in a predetermined amount of time, that specific application detail will disappear from the table. The column headers may be altered in the future to reflect the information requested by each specific finance source. Should a credit reviewer opt to review an application, they would then fill out the terms of the specific contract options (money down, term length, comments, stipulations, etc.) on their own company form, and send the information electronically back to BankHunter. That information would then be visible to the dealer user on the Deal History page (FIG. 10) by clicking on the name of the corresponding applicant.

FIGS. 12A and 12B each show a flowchart of overall steps according to an embodiment of the system.

FIG. 12A illustrates an overview of the BankHunter process, as illustrated in specifics with the attached flowcharts.

FIG. 12B illustrates an overview of the Rapid Portfolio process, with the specific validations for each function in an embodiment, and other combinations of validations are intended within the present scope of the present invention. These are outlined in the flowchart (FIG. 3).

Various embodiments, as described in the above, may contain aspects that are not found in other existing software processes. These include the usage of a sorting algorithm that:

Considers credit bureau scoring from all three credit bureaus.

Considers whether or not a specific bank accepts scores from each respective credit bureau.

Ranks specific questions for positive and derogative connotation (BankHunter questions 5-24, 34, 36,39 from FIG. 6) are scored based on individual banks, This is not considered by other software programs.

Considers applicant's personal information (BankHunter questions 25-32, 37-48 in FIG. 6), deal structure as assembled by the dealer, and the specifics of the vehicle customer wishes to purchase. Information is scored in relation to individual banks. This is not considered by other software programs.

Allows vehicle dealership to assemble online a list of banks with which it has agreements.

It should be noted that unlike the mortgage industry, a vehicle dealership cannot solicit all finance sources in search of a purchaser for its customer's installment contract. The dealer must have an active agreement with the bank (or in the case of a credit union, the buyer must be a member of the credit union), or the contract cannot be purchased. The system in an embodiment allows the dealer to sort according only to those finance sources that would be eligible to purchase the contract.

The BankHunter system of an embodiment acts as an analysis tool, matchmaking algorithm, and buyer-dealer-bank relationship manager, whereas existing software methods are a pass-through for information. Any existing sorting algorithm is specific to the bank that created it, and it would have no application to the details of the vehicle or deal structure, nor would it consider multiple, such as the preferred three, credit bureaus as described herein. Conventionally, at the present time, all credit applications are currently reviewed manually by the banks, unless the customer's high score on the credit bureau that the specific finance source accepts is high enough to qualify for an automatic approval. This also coincides with a specific loan program that is always temporary, not permanent. Loan approval on this basis also relies upon the dealer to know where to submit the application. Without specific knowledge of a current specific loan program offered by a particular bank, the dealer may forget to submit the application to said bank, or captive (brand) lender.

In an embodiment, under the Rapid Portfolio Management system, banks can preview non-sensitive, non-private customer/vehicle/deal information prior to submitting and/or bidding on the terms of the contract, and such banks will rely upon the fit score as described herein (see FIG. 11) to do so. Since, in an embodiment, the sorting algorithm requires no input of sorting information parameters from the dealer, no human influence hinders the vehicle buyer and dealer's effort to locate the best-fitting finance source offering the most advantageous terms to the buyer. In addition, in an embodiment, influence of any and all factors of race, ethnicity, gender, or any other trait that can potentially affect the vehicle finance process can be remove.

In this specification and the accompanying drawings, reference is made to particular features of embodiments of the invention. It is to be understood that the disclosure in this specification includes all possible combinations of such particular features. For example, where a particular feature is disclosed in the context of a particular aspect, a particular embodiment, or a particular Figure, that feature can also be used, to the extent appropriate, in the context of other particular aspects, embodiments and Figures, and in the invention generally.

One or more of the embodiments of the invention may be implemented as apparent to those skilled in the art in hardware or software, or any combination thereof. The actual software code or specialized hardware used to implement an embodiment of the invention is not limiting of the invention. Thus, the operation and behavior of the embodiments often will be described without specific reference to the actual software code or specialized hardware components. The absence of such specific references is feasible because it is clearly understood that artisans of ordinary skill would be able to design software and hardware to implement the embodiments of the invention based on the description herein with only a reasonable effort and without undue experimentation.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as comparing, which are commonly associated with mental operations performed by a human operator. No such capability of a human operator is necessary, or desirable in most cases, in any of the operations described herein. Useful machines for performing operations of one or more embodiments of the invention include general purpose digital computers or similar devices.

Each step of the method may be executed on any general computer, such as a mainframe computer, personal computer or the like and pursuant to one or more, or a part of one or more, program modules or objects generated from any programming language, such as C#, C++, Java, Fortran or the like. And still further, each step, or a file or object or the like implementing each step, may be executed by special purpose hardware or a circuit module designed for that purpose. For example, an embodiment of the invention may be implemented as a firmware program loaded into non-volatile data storage medium or a software program loaded from or into a data storage medium as machine-readable code, such code being instructions executable by an array of logic elements such as a microprocessor or other digital signal processing unit.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified.

An embodiment of the invention may desirably be implemented in a high level procedural or object-oriented programming language to communicate with a computer. However, an embodiment of the invention may be implemented in assembly or machine language, if desired. In any case, the language may be a compiled or interpreted language.

An embodiment of the invention may be implemented as an article of manufacture comprising a computer usable medium having computer readable program code means therein for executing the method steps of an embodiment of the invention, a program storage device readable by a machine, tangibly embodying a program of instructions executable by a machine to perform the method steps of an embodiment of the invention, or a computer program product, or an article of manufacture comprising a computer usable medium having computer readable program code means therein, the computer readable program code means in said computer program product comprising computer readable code means for causing a computer to execute the steps of an embodiment of the invention or a computer readable medium encoded with a set of executable instructions to perform the method steps of an embodiment of the invention. Such an article of manufacture, or computer program product, or computer usable medium may include, but is not limited to, CD-ROMs, diskettes, tapes, hard drives, computer system memory (e.g. RAM or ROM) and/or the electronic, magnetic, optical, biological or other similar embodiment of the program.

An embodiment of the invention may be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone, PDA or laptop).

The system may be specially constructed for the required purposes to perform, for example, the method steps of an embodiment of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While one or more embodiments of the invention have been described, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention. Many modifications and variations are possible in light of the above teaching. Thus, it should be understood that the above described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

We claim:

1. An automated method of determining a ranked list of finance sources for purchase of an article by a buyer using a computer system comprising:
    capturing data associated with the buyer into the computer system, the data associated with the buyer including a finance application that includes buyer personal information, buyer income, a requested loan amount, and an intended down payment, and responses to a series of predetermined questions relevant to the purchase of the article, and a credit history of the buyer obtained from each of multiple credit bureaus;
    capturing finance requirements for each of a plurality of finance sources into the computer system, the finance requirements for each of the plurality of finance sources being provided by each finance source and including usable credit score, minimum credit score allowable, and whether that finance source allows each of foreclosures, bankruptcies, and tax liens; and
    executing an algorithm configured to match the buyer with any of the plurality of finance sources, using the computer system, by:
        determining whether the buyer meets the finance requirements of any of the plurality of finance sources by comparing the certain of data associated with the buyer to the finance requirements established by each of the finance sources, thereby resulting in eligible finance sources;
    obtaining a fit score between the buyer and each of the eligible finance sources, the fit score obtained by automatically determining the fit score based upon a comparison of responses to lending requirements of each of the eligible finance sources, wherein the fit score is a percentage determined by dividing a total number of the responses answered in the affirmative by a total number of questions and wherein the series of responses answered in the affirmative include:
        that an estimated payment to income is less than a payment to income maximum of the finance source;
        that the buyer income is great than a minimum income required by the finance source; and
            that the buyer resides at a residence for longer than a minimum residence time required by the finance source;
        ranking the eligible finance sources based on the fit score associated with each of the eligible finance sources; and
        generating the ranked list of the eligible finance sources.

2. The method of claim 1, wherein the article is a vehicle.

3. The method of claim 2, wherein the data associated with the buyer further includes vehicle attributes.

4. The method of claim 2, wherein the ranked list does not include finance sources not associated with a vehicle dealer.

5. The method of claim 1, wherein the step of determining whether the buyer meets the finance requirements includes rejecting finance applications that do not meet the finance requirements.

6. The method of claim 1, wherein the ranked list does not include finance sources not associated with a vehicle dealer.

7. The method of claim 1, wherein the step of determining whether the buyer meets the finance requirements includes rejecting finance applications that do not meet the finance requirements.

8. The method of claim 1, wherein the data associated with the buyer further includes attributes of items subject to finance.

9. The method of claim 1, further including the step of the computer system receiving selected application list from at least one of the finance sources, and wherein personal identifying information of applicants associated with one of the finance applications is not provided by the computer system to any one of the finance sources prior to the computer receiving the selected application list from that one finance source.

10. The method of claim 1, wherein the ranked list of the eligible finance sources is generated without manual intervention based upon a particular fit score above a threshold.

11. The method of claim 1, further comprising generating a report including a history of transaction activity by dealers associated with a portfolio of finance applications.

12. The method of claim 1, wherein an average fit score is determined for a portfolio of finance applications.

13. The method of claim 1, wherein an average fit score is determined for a specific date range of finance applications.

* * * * *